(12) United States Patent
Schwartz et al.

(10) Patent No.: US 12,716,496 B2
(45) Date of Patent: Aug. 25, 2026

(54) SEAL ARRANGEMENT IN THE COOLING CIRCUIT OF AN E-AXLE MODULE

(71) Applicant: Robert Bosch GmbH, Stuttgart (DE)

(72) Inventors: Daniel Schwartz, Wiernsheim (DE); Markus Feigl, Markgroeningen (DE); Philipp Breinlinger, Karlsruhe (DE); Theresa Sophia Staron, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/692,492

(22) PCT Filed: Aug. 2, 2022

(86) PCT No.: PCT/EP2022/071648
§ 371 (c)(1),
(2) Date: Mar. 15, 2024

(87) PCT Pub. No.: WO2023/041240
PCT Pub. Date: Mar. 23, 2023

(65) Prior Publication Data

US 2024/0426379 A1 Dec. 26, 2024

(30) Foreign Application Priority Data

Sep. 17, 2021 (DE) ..................... 10 2021 210 319.7

(51) Int. Cl.
*F16J 15/32* (2016.01)
*F16J 15/3204* (2016.01)

(52) U.S. Cl.
CPC ................................ *F16J 15/3204* (2013.01)

(58) Field of Classification Search
CPC .... F16J 15/18; F16J 15/20; F16J 15/26; F16J 15/32; F16J 15/3204
See application file for complete search history.

(56) References Cited

U.S. PATENT DOCUMENTS 355,283 A * 12/1886 Tefft et al. ............... F16J 15/32 277/513
4,018,461 A * 4/1977 Bram ...................... F16L 47/08 277/625
(Continued)

FOREIGN PATENT DOCUMENTS

DE 102004058302 A1 3/2006
DE 102011076312 A1 11/2012
(Continued)

OTHER PUBLICATIONS

Translation of International Search Report for Application No. PCT/EP2022/071648 dated Dec. 7, 2022 (3 pages).

*Primary Examiner* — Christine M Mills
*Assistant Examiner* — L. Susmitha Koneru
(74) *Attorney, Agent, or Firm* — Michael Best & Friedrich LLP

(57) ABSTRACT

The invention relates to a seal arrangement (40) in the cooling circuit of an E-axle module (10) comprising at least one electric machine (14) and at least one power electronics system (24). The seal arrangement (40) comprises a tubular insert (48) on which a first sealing element (62, 72) is arranged and which has an associated further sealing element (64, 76, 80) on one of its end sides (96, 98). An overflow opening (56) is located between the sealing elements (62, 72, 64, 76, 80). The invention also relates to the use of the seal arrangement (40) in the cooling circuit between an electric machine (14) and a power electronics system (24) of an E-axle module (10) of an electrically driven vehicle.

11 Claims, 5 Drawing Sheets

(56) References Cited

U.S. PATENT DOCUMENTS 4,345,735 A * 8/1982 Regan ..................... F16J 15/46 251/1.2
4,496,161 A * 1/1985 Fischer .................... F16J 15/32 277/449
4,669,763 A * 6/1987 Phillips ................. F16L 19/065 285/911
10,591,070 B2 * 3/2020 Nowell ................. F04B 53/164
10,895,325 B2 * 1/2021 Nowell ................... F04B 53/22
10,907,738 B2 * 2/2021 Nowell ................... F15B 21/00
11,143,315 B2 * 10/2021 Nowell ................... F16K 5/184
11,649,900 B2 * 5/2023 Nowell ................... F15B 21/00 251/309
2005/0093246 A1 * 5/2005 Dietle .................. F16J 15/3244 277/549
2012/0148431 A1 * 6/2012 Gabriel ................. E21B 43/126 417/559
2014/0217727 A1 8/2014 Miyajima et al.
2018/0017173 A1 * 1/2018 Nowell ................. F16K 5/0464
2019/0353288 A1 * 11/2019 Hoeting .............. F16C 33/7886
2020/0011434 A1 * 1/2020 Nowell ................... F16K 5/181
2020/0240531 A1 * 7/2020 Nowell ................... F04B 53/22
2021/0102630 A1 * 4/2021 Nowell ................... F16K 5/184
2021/0404561 A1 * 12/2021 Nowell .................. F16J 15/062
2023/0018160 A1 * 1/2023 Nowell .................. F16J 15/062
2023/0243227 A1 * 8/2023 Walker ..................... F16J 15/08 277/322

FOREIGN PATENT DOCUMENTS

DE 102012019106 A1 4/2014
DE 102014225925 A1 6/2016
DE 102019124280 A1 3/2021
EP 3663689 A1 6/2020
FR 2790303 A1 9/2000
WO 2007040408 A1 4/2007
WO 2020189826 A1 9/2020

* cited by examiner 24
20
12
26
30
14
16

12
16
20
30
28
12
26

12
16

SEAL ARRANGEMENT IN THE COOLING CIRCUIT OF AN E-AXLE MODULE

BACKGROUND

The invention relates to a seal arrangement in the cooling circuit of an E-axle module, comprising at least one electric machine and at least one power electronics system. Furthermore, the invention relates to the use of the seal arrangement in the cooling circuit of an E-axle module.

DE 10 2012 019 106 A1 refers to a plug-in piece. This is used for the sealing connection of two associated cylindrical surfaces, which comprises an essentially tubular support body. This has ring-shaped circumferential sealing elements at its ends. These can be brought into engagement with one of the cylindrical surfaces to be sealed in order to produce a sealed connection, wherein at least one of the sealing elements is designed as a ring-shaped circumferential sealing bead with a spherically curved sealing surface on the outer surface of the support body. It is intended that the spherical radius of the sealing surface be selected so that the center of the sphere lies approximately on the axis of symmetry of the support body. This ensures a largely constant contact pressure across the sealing surface, regardless of the angular position of the plug-in piece in the installation space.

DE 10 2014 225 925 A1 relates to a seal arrangement and a method for assembling a seal arrangement. On the outer circumference of an essentially ring-shaped sealing part, there are two beads protruding radially over the circumference. A contact pressure is achieved by the fact that spring elements are located on both end faces of the essentially ring-shaped sealing body, which adjust the beads molded onto the outer circumference against an inner housing surface when the sealing bushing is mounted, so that the beads are in sealing contact with the inside.

DE 10 2004 058 302 A1 relates to a sealing bushing, in particular for a hydraulic device. The sealing bushing is made of a plastic material and has a preferably conical elevation on one end face, which can be placed against a contact shoulder or the like in a sealing manner. A truncated cone-shaped elevation is designed on a rear end face, into which a sealing bushing bore opens. The raised section ends in an end face at a distance from the outer circumference of the sealing bushing.

DE 10 2011 076 312 A1 relates to a cooling device for a housing. At least one power electronics system component is accommodated in the housing. A cooling structure provides a cooling surface to the housing. During production of the housing, the cooling structure to be overmolded is supported by a medium that acts on the cooling structure to be overmolded.

SUMMARY

According to the invention, a seal arrangement in the cooling circuit of an electric axis module, comprising at least one electric machine and at least one power electronics system, is proposed. The seal arrangement comprises a tubular insert on which a first sealing element is arranged, a further sealing element which is associated with one of the end faces and an overflow opening is provided between the sealing elements.

Thanks to the arrangement of the overflow hole in the wall of a housing, this solution makes it possible to effectively and reliably seal a cavity in a power electronics system against cooling medium flowing through the cooling circuit, so that the functionality of the power electronics system is guaranteed at all times.

In an advantageous configuration of the seal arrangement proposed according to the invention, the tubular insert is accommodated in a recess of a housing of the electric machine, wherein the overflow opening is formed in a wall of the housing. The overflow opening in one wall of the housing is dimensioned in such a way that the flow of cooling medium constantly following the tubular insert can be diverted and the tightness of the cavity of the power electronics system with the electronic semiconductor components accommodated therein is always guaranteed.

In a further advantageous configuration of the sealing arrangement proposed according to the invention, the tubular insert is designed with a conicity that corresponds to a conicity of a recess in the housing. The conicity of the tubular insert and the recess prevents damage to a sealing element on the circumference of the tubular insert when it is inserted vertically into the recess, which considerably simplifies production.

The seal arrangement proposed according to the invention comprises the first sealing element, which can be designed as an O-ring and is seated on a lateral surface of the tubular insert. For this purpose, it can be provided with at least one circumferential groove extending in the circumferential direction of the tubular insert. It is also possible to design the first sealing element as a V-shaped sealing disk and arrange it on one of the end faces of the tubular insert. As the pressure of the cooling medium increases, the V-shape of the sealing disk causes the seal to expand and the sealing parts of the V-shaped sealing parts to press firmly against opposite walls of the housing or the tubular sealing element, so that the cavity of the power electronics system remains sealed at all times.

In a further advantageous configuration of the seal arrangement proposed according to the invention, the further sealing element can also be designed as an O-ring and arranged on a lateral surface of the tubular insert. It is also possible to design further sealing elements as a V-shaped sealing disk or as an X-ring and assign them to one of the end faces of the tubular insert. The geometry of the further sealing element, in particular in the form of a V-shaped sealing disk or X-ring, can also be used to widen the sealing element and thus achieve better contact between the sealing parts of the further sealing element and opposing walls.

In a further advantageous configuration of the seal arrangement proposed according to the invention, the first sealing element and the further sealing element can each be designed as an O-ring, which are arranged at a vertical distance from one another in relation to the tubular insert.

The seal arrangement proposed according to the invention allows the cavity of the power electronics system to be effectively sealed against the cooling medium flowing through the housing or the tubular insert via the first sealing element.

In a further alternative embodiment possibility of the seal arrangement, this comprises an insert part, for example a connecting piece, on which an O-ring is designed and which encloses a tube, wherein the O-ring seals a cavity of the power electronics system against downstream cooling medium. The insert part and the pipe can be sealed using a molded seal or alternatively using a further sealing ring.

Furthermore, the invention relates to the use of the seal arrangement according to the illustrated embodiment variants in a cooling circuit of an E-axle module with an electric machine and power electronics system accommodated in a housing.

The solution proposed according to the invention makes it possible to create a compact sealing arrangement that allows multiple sealing. In addition to the tubular insert, the seal arrangement proposed according to the invention comprises said sealing elements, namely at least a first sealing element and a further sealing element. These can be designed in different embodiment variants, but in all embodiment variants they are located at a vertical distance from each other in relation to the axial extension of the tubular insert.

In particular, in the solution proposed according to the invention, when the tubular insert is mounted in a recess on a housing, it is ensured that an overflow opening in the housing located between the first sealing element and the further sealing element allows the cooling medium to flow out. The overflow opening in the wall of the housing or in the wall of the recess in the housing, for example of the electric machine, is dimensioned in such a way that it is ensured that the cooling fluid flowing in via the tubular insert can be safely discharged.

If, for example, one of the sealing elements is designed as a V-shaped sealing disk, the geometry of the sealing element can also absorb an increased pressure level. With a V-shaped sealing geometry or also with a sealing element designed as an X-ring, the pressure increase, for example via a constant inflow of cooling medium, ensures that the V-shaped sealing geometry in each case is pressed against contact surfaces with increased contact pressure, whether against the wall of the cavity or the lateral surface of the tubular insert, and thus an increased sealing effect is achieved, which can reliably prevent undesired penetration of cooling medium into the cavity of the power electronics system. This applies to both the first sealing element and the further sealing element, irrespective of whether the sealing elements are each accommodated on the lateral surface of the tubular insert or on one of the end faces of the tubular insert or are associated with these.

If, for example, both the tubular insert and the recess are designed in a conical shape, it can be ensured during the assembly of, for example, two O-ring-shaped sealing elements that damage to the sealing elements designed as O-rings due to burrs in the area of the overflow opening can be ruled out during production.

With the solution proposed according to the invention, the cooling circuit between the power electronics system (inverter) and the electric machine of an E-axle module is sealed at low cost. Furthermore, the use of the solution proposed according to the invention ensures simple assembly. Furthermore, the seal arrangement proposed according to the invention with a double seal ensures that under no circumstances can cooling fluid enter the cavity of the power electronics system in which the semiconductor components are arranged. The solution proposed according to the invention is characterized overall by the use of fewer components, and the manufacturing costs are also significantly reduced. The assembly effort is also reduced and assembly safety is increased, as damage to the first sealing element or the further sealing element is prevented, for example due to the conicity of the tubular insert and corresponding recess. Furthermore, by integrating the tubular insert into a recess in one of the housings, less space is required, as the seal arrangement is to a certain extent enclosed by the housing, for example the electric machine.

The seal arrangement proposed according to the invention, which offers a double sealing option, seals the cooling circuit and power electronics system from the environment. The two seals are spatially separated from each other so that if one seal fails, the overflow opening continuously drains off any cooling fluid flowing in, thus ensuring that cooling fluid flowing in does not penetrate into the cavity of the power electronics system. Furthermore, the spatial separation of the first and further sealing element has the advantage that a leak test can be carried out more easily during servicing or in the event of a failure, and any possibly present leakage can be located more quickly.

BRIEF DESCRIPTION OF THE DRAWINGS

Embodiments of the invention are explained in greater detail with reference to the drawings and the following description.

Here.

DETAILED DESCRIPTION

Figure 1:
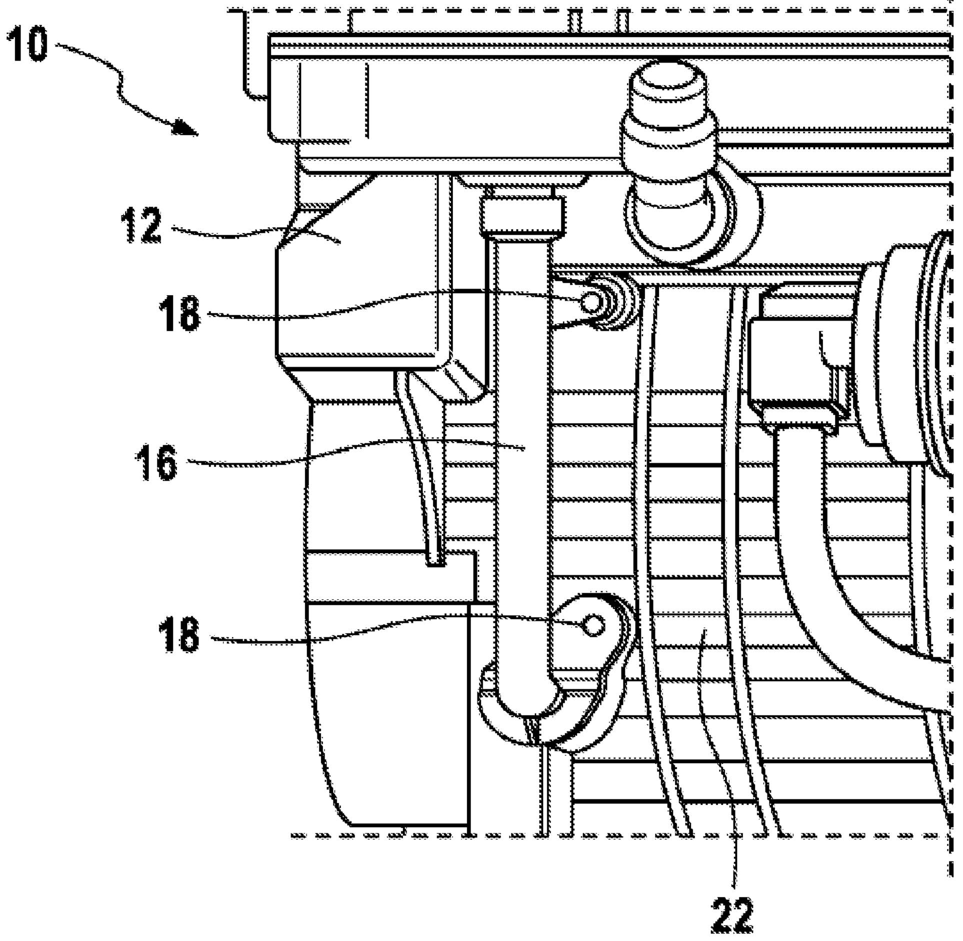
FIGS. 1 through 3 show a seal arrangement between an electric machine on the one hand and a housing of power electronics system on the other, using a plastic line running outside the housing and a sealing bushing, FIG. 4 a first embodiment variant of the seal arrangement proposed according to the invention, FIG. 5 a further embodiment variant of the seal arrangement proposed according to the invention using a tubular insert with a conicity, FIG. 6 a further embodiment variant of the seal arrangement proposed according to the invention with a further sealing element designed as a V-shaped sealing disk, FIG. 7 a further embodiment variant of the seal arrangement proposed according to the invention with a sealing element designed as a V-shaped sealing disk, FIGS. 8, 9 embodiment variants of a seal arrangement with an insert part comprising a tube embedded in it.

FIG. 1 shows an E-axle module 10 with an electric machine 14 in its housing 12. A plastic line 16 runs along the outside of the housing 12, is connected to a housing wall 22 and is fastened to the housing 12 via several fastening flanges 18.

Figures 2, 3:
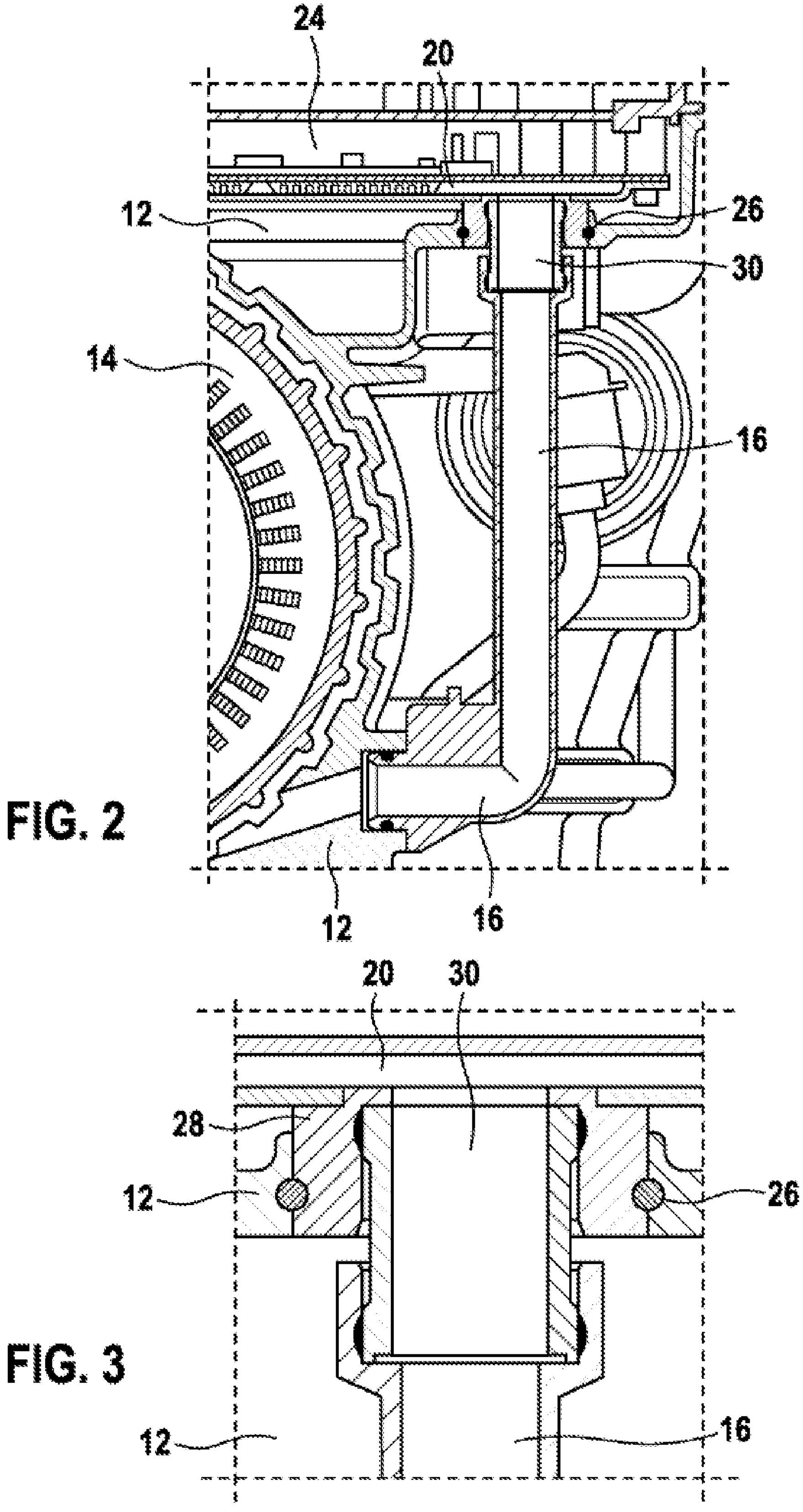

FIG. 2 shows a side view of the housing 12 of the electric machine 14. The housing 12 accommodates the electric machine 14; a cooling line extends from this to the plastic line 16, in which a sealing bushing 30 is embedded. As shown in FIG. 2, the sealing bushing 30 is enclosed by a connecting piece 28, which is sealed to the housing 12 by means of a seal 26.

FIG. 3 shows an enlarged view of the sealing bushing 30, which is sealed with one end in the connecting piece 28 and with its other end in the plastic line 16. For its part, the connecting piece 28 is sealed into the housing 12 by means of a seal 26 designed as an O-ring. A cavity 42 of a power electronics system 24 is sealed against the cooling medium flowing through the plastic line 16 via the sealing bushing 30.

EMBODIMENTS OF THE INVENTION

In the following description of the embodiments of the invention, identical or similar elements are denoted by identical reference numbers, wherein a repeated description of these elements is omitted in individual cases. The figures illustrate the subject-matter of the invention merely schematically.

Figure 4:
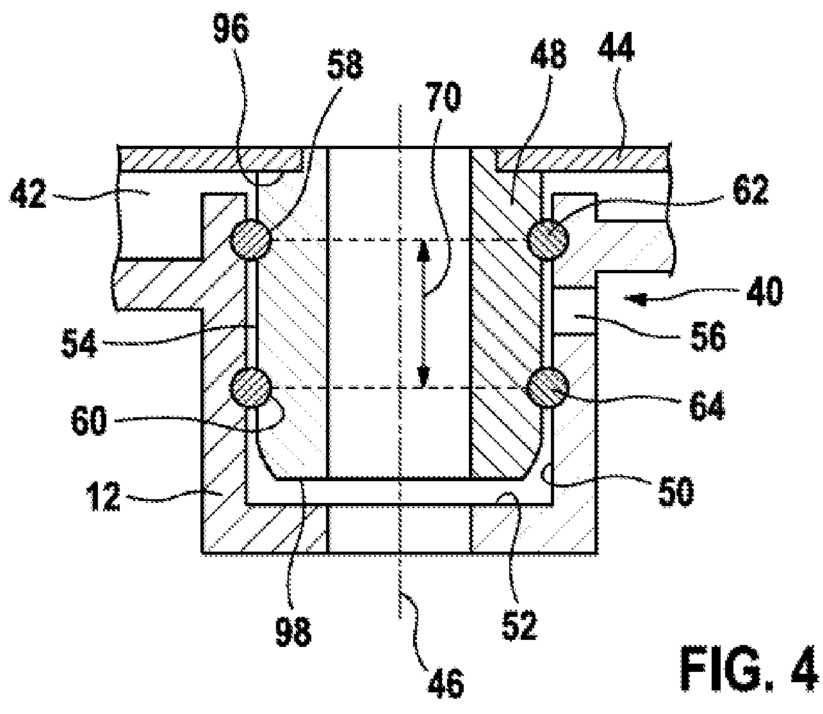

FIG. 4 shows a first embodiment variant of a seal arrangement 40 proposed according to the invention A cavity 42 of the power electronics system 24 of the E-axle module 10 is sealed via the seal arrangement 40 against a cooling medium circulating in the cooling circuit of an E-axle module 10. FIG. 4 shows that the cavity 42 of the power electronics system 24 is bounded by a housing plate 44, which is only shown schematically here. The seal arrangement 40 essentially comprises a tubular insert 48 which is embedded in a recess 52 of a housing wall 22 of the housing 12 of the electric axis module 10 or the electric machine 14. The illustration according to FIG. 4 shows that the tubular insert 48 is made symmetrical to an axis of symmetry 46. According to FIG. 4, the housing 12 comprises an overflow opening 56 extending from its inner lateral surface 50, which can be designed as a bore, for example. A first sealing element 62 and a further sealing element 64 are located on a lateral surface 54 of the tubular insert 48. These are arranged at a vertical distance 70 from one another with respect to the axis of symmetry 46 of the tubular insert 48. The sealing elements 62, 64, for example in the form of an O-ring, can be embedded and axially fixed in recesses 58, 60 formed on the lateral surface 54 of the tubular insert 48. FIG. 4 shows that the overflow opening 56 is located approximately in the middle between the two sealing elements 62, 64.

If the further sealing element 64 fails and becomes leaky, cooling fluid flows out of the housing 12 via the overflow opening 56, so that it is ensured that the cavity 42 of the power electronics system 24 remains sealed against the cooling medium flowing in by the first sealing element 62. As a result, the cavity 42 of the power electronics system 24, including the semiconductor components arranged therein, remains dry, so that the functionality of an electrically driven vehicle is maintained.

While according to the seal arrangement 40, as shown in FIG. 4, the cavity 42 of the power electronics system 24 remains sealed if the further sealing element 64 fails, the cooling circuit is sealed against the environment via the further sealing element 64. The overflow opening 56 shown in FIG. 4 is designed in such a way that sufficient cooling medium can be discharged through it. Instead of the overflow opening 56 shown in the sectional view according to FIG. 4, several overflow openings 56 can also be formed in the wall of the recess 52 of the housing 12.

Figure 5:
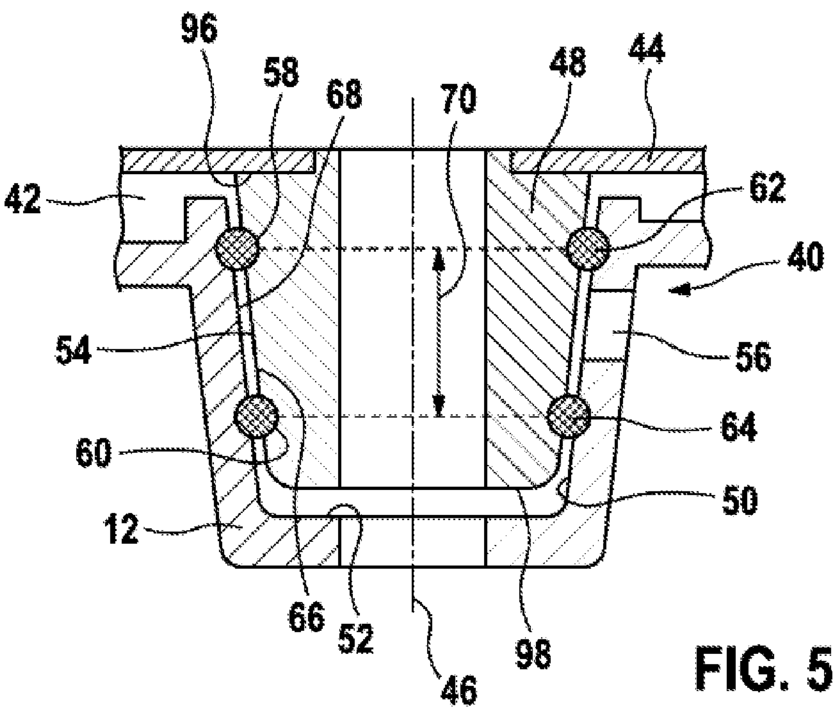

FIG. 5 shows a further embodiment variant of the embodiment variant of the seal arrangement 40 according to the invention shown in FIG. 4. In contrast to the representation shown in FIG. 4, in the embodiment variant shown in FIG. 5 both the tubular insert 48 and the recess 52 are manufactured in conicities 66 and 68 respectively with respect to their inner lateral surface 50. In the illustration according to FIG. 5, O-rings 86 are used as sealing elements 62, 64. The conicity 66 of the lateral surface 54 of the tubular insert 48 and the conicity 68 of the recess 52 ensure that, when the further sealing element 64 in the form of an O-ring 86 is assembled, damage caused, for example, by remaining burrs on the inner lateral surface 50 of the recess 52 in the area of the overflow opening 56 does not damage the further sealing element 64. In the embodiment variant according to FIG. 5, the at least one overflow opening 56 is also dimensioned such that sufficient cooling fluid can be drained off, wherein the tightness of the cavity 42 of the power electronics system 24 remains ensured by the contact of the first sealing element 62, which is designed as an O-ring 86, in its first recess 58 on the one hand and on the inner lateral surface 50 of the recess 52 on the other hand. A first end face of the tubular insert 48 is identified by reference number 96, while an opposite second end face of the tubular insert 48 is identified by reference number 98. In the area of the first end face 96, the tubular insert 48 is enclosed by the housing plate 44. In the embodiment variants of the seal arrangement 40 according to the invention as shown in FIGS. 4 and 5, the two sealing elements 62, 64—each designed here as O-rings 86—are spaced apart by a distance 70 in the vertical direction. Within this distance 70, the at least one overflow opening 56 is located in the housing wall 22 of the housing 12 of the electric machine 14. In the embodiment variant shown in FIG. 5, the tubular insert 48 is also manufactured symmetrically to its axis of symmetry 46.

Figure 6:
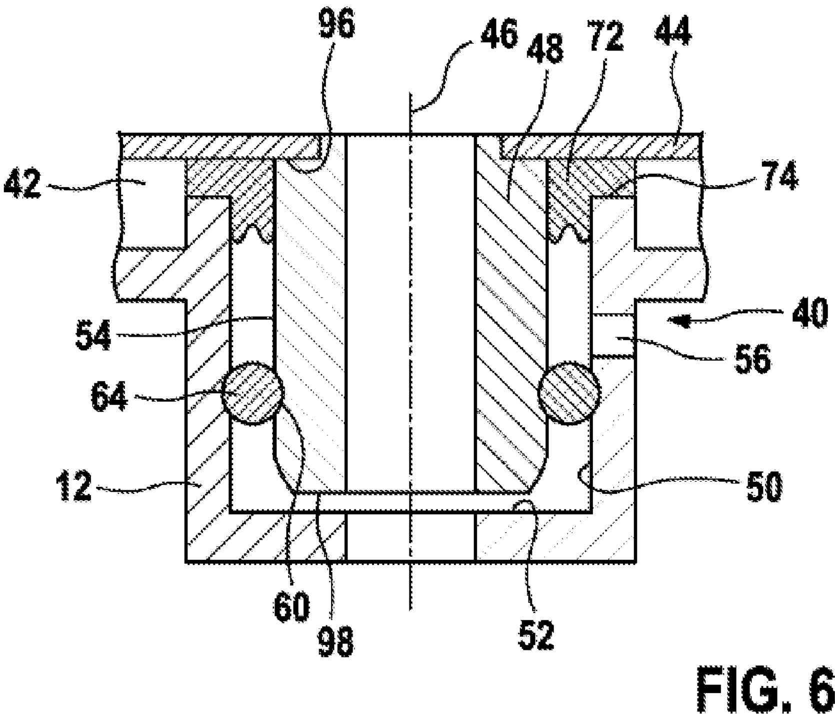

FIG. 6 shows a further embodiment variant of the seal arrangement 40 proposed according to the invention. According to this embodiment variant, the further sealing element 64 is designed as a V-shaped sealing disk 72. While the further sealing element 64—here designed as an O-ring 86—is accommodated in the second recess 60 on the lateral surface 54 of the tubular insert 48, the further sealing element 64 in the form of the V-shaped sealing disk 72 is associated with an end face 74 of the first end face 96 of the tubular insert 48. The illustration according to FIG. 6 shows that also in this embodiment variant, the at least one overflow opening 56 is located in the area between the first sealing element 62 in the form of the V-shaped sealing disk 72 and the further sealing element 64 in the form of an O-ring 86. In the embodiment variant of the seal arrangement 40 proposed according to the invention as shown in FIG. 6, multiple overflow openings 56 can also be formed in the wall delimiting the recess 52.

If the further sealing element 64 in the form of the O-ring 86 fails, the cooling medium flowing in the gap between the lateral surface 54 of the tubular insert 48 and the inner lateral surface 50 pushes the V-shaped sealing disk 72 apart. As a result, the material of the further sealing element 64 in the form of the V-shaped sealing disk 72 is pressed against the material of the inner lateral surface 50 of the recess 52 on the one hand and against the lateral surface 54 of the tubular insert 48 on the other, so that the sealing effect is improved as the pressure increases. As a result, the cavity 42 of the power electronics system 24, including the semiconductor components accommodated therein, remains sealed against the cooling medium flowing in.

Figure 7:
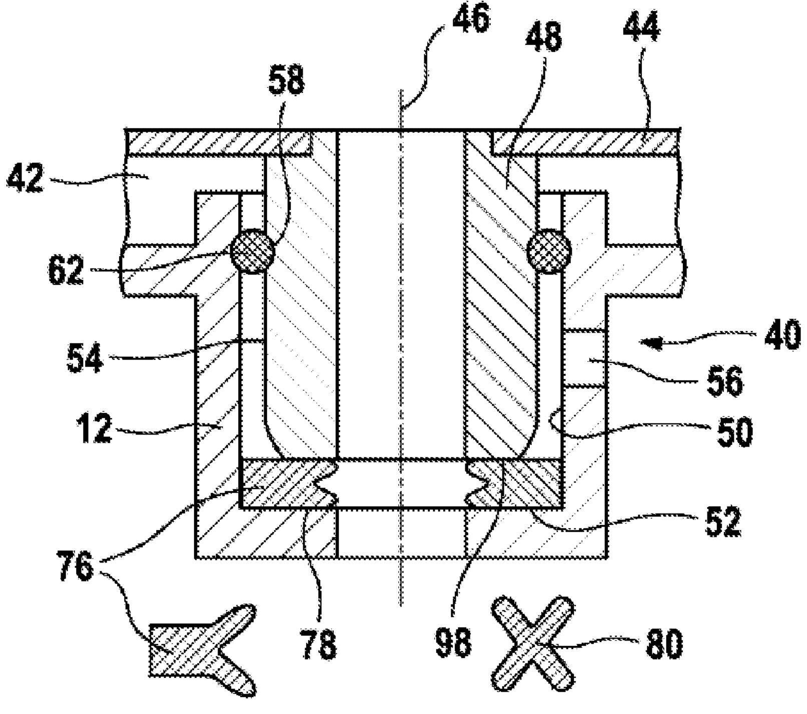

In the embodiment variant of the seal arrangement 40 proposed according to the invention as shown in FIG. 7, the first sealing element 62 is designed as an O-ring 86. The first sealing element 62 is embedded in the first recess 58 on the lateral surface 54 of the tubular insert 48. In the embodiment variant shown in FIG. 7, the tubular insert 48 is also symmetrical to its axis of symmetry 46.

In the embodiment variant shown in FIG. 7, the further sealing element 64 is designed as a V-shaped sealing disk 76. This rests on a flat surface 78 at the bottom of the recess 52 of the housing 12, which is shaped like a pot, for example. The further sealing element 64 in the form of the V-shaped sealing disk 76 lies between the second end face 98 of the tubular insert 48 and the flat surface 78 at the bottom of the recess 52, which is for example pot-shaped. In the embodiment variant shown in FIG. 7, the overflow opening 56 is also located in the area between the first sealing element 62, which is designed as an O-ring 86, on the one hand and the further sealing element 64, which in this case is designed as a V-shaped sealing disk 76. If, in the embodiment variant according to FIG. 7, the pressure of the cooling medium increases at the seal arrangement 40, the V-shaped sealing disk 76 used as a further sealing element 64 is pressed on the inside against the second end face 98 of the tubular insert 48 on the one hand and against the flat surface 78 at the bottom of the recess 52 on the other hand due to its V-shaped geometry. If the further sealing element 64 fails, however, the cavity 42 of the power electronics system 24 with its liquid-sensitive components remains in its sealed state via the first sealing element 62 designed as an O-ring 86, i.e., the cooling medium can be discharged via the overflow opening 56 in the wall of the recess 52 of the housing 12.

As an alternative to the V-shaped sealing disk 76 shown in FIG. 7, the further sealing element 64 can also be designed as an X-ring 80. Due to its deformability and its geometry, this is also suitable for generating higher sealing forces when the pressure of the cooling medium in the cooling circuit increases, since its geometry means that areas of the X-ring 80 are pressed either against the flat surface 78 at the base of the recess 52 on the one hand and against the second end face 98 of the tubular insert 48 on the other, and an increased sealing effect can be achieved.

Figure 8:
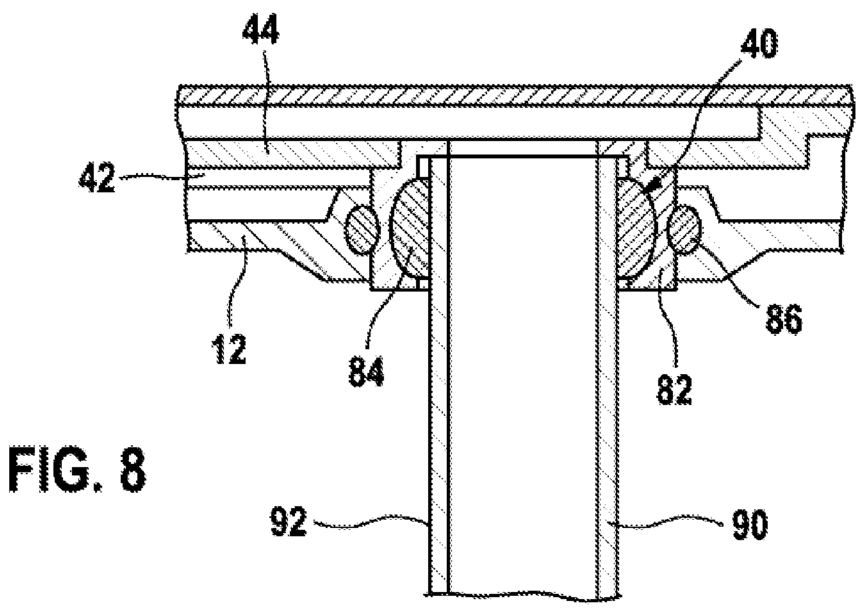
Figure 9:
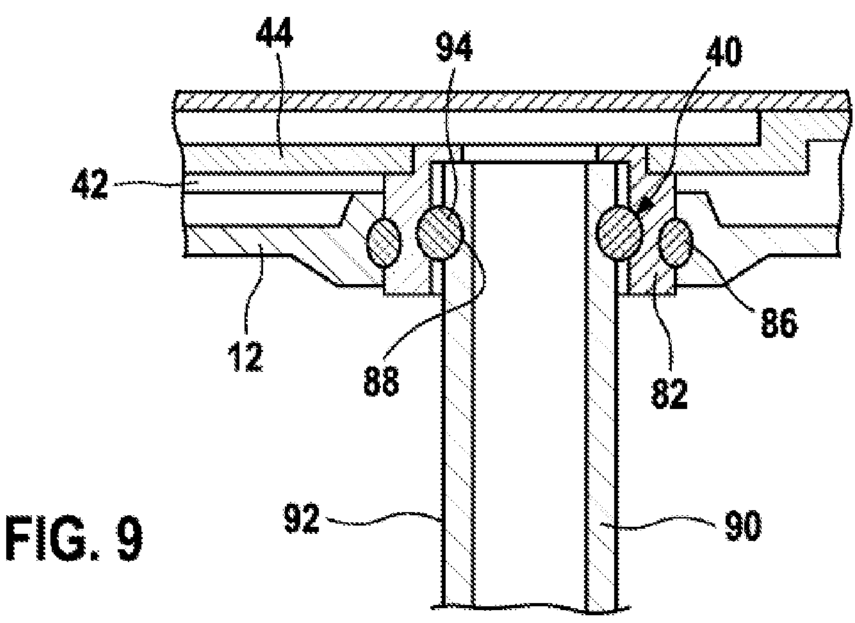

The embodiment variants of FIGS. 8 and 9 show further embodiment variants of the seal arrangement 40 proposed according to the invention.

For example, FIG. 8 shows a seal arrangement 40 comprising an insert part 82. The insert part 82 is essentially formed by a connecting piece 28 together with an O-ring 86. On the other hand, the connecting piece 28 of the insert part 82 is sealingly connected to a pipe lateral surface 92 of a pipe 90, for example via a molded seal 84. The cavity 42 power electronics system 24, which is bounded by the housing plate 44, is sealed against the cooling medium flowing through the tube 90 via the O-ring 86. If the molded seal 84, for example vulcanized onto the pipe lateral surface 92 of the pipe 90, fails, the cooling medium flows downwards due to the force of gravity. The higher positioned passage to the power electronics system 24 and the O-ring 86 arranged there does not come into contact with the cooling medium.

FIG. 9 shows a further embodiment variant of the seal arrangement 40 according to FIG. 8. In the embodiment variant shown in FIG. 9, a further sealing ring 94, designed as an O-ring 86, is provided instead of a molded seal 84. This is embedded in a circumferential groove 88. The same applies here as mentioned in connection with FIG. 8. The difference between the representations according to FIGS. 8 and 9 lies in the use of an O-ring 86 as a further sealing ring 94 instead of a seal 84 molded onto the pipe lateral surface 92 of the pipe 90.

All seal arrangements 40 proposed according to the invention, as described above with reference to FIGS. 4 through 9, have a sealing concept in which a first sealing element 62 and a further sealing element 64 are used. One of the two seals 62, 64 seals the cooling circuit against the environment, while the other sealing element seals the power electronics system 24 or its cavity 42 against the cooling medium. The two sealing elements 62, 64 are spatially separated from each other, i.e., at a vertical distance 70, irrespective of their respective configuration, so that in the event of cooling medium escaping, this cannot penetrate into the cavity 42 of the power electronics system 24. Furthermore, the spatial separation of the two sealing elements 62, 64 has the advantageous effect that a leak test can be carried out more easily in the event of servicing or failure, as the leak can be detected more quickly.

The invention is not limited to the embodiment examples described herein and the aspects emphasized thereby. Rather, within the range specified by the claims, a large number of modifications are possible which lie within the abilities of a person skilled in the art.

The invention claimed is:

1. An E-axle module (10) comprising:

an electric machine (14) accommodated in a housing (12);

a power electronics system (24); and a seal arrangement (40) in a cooling circuit of the E-axle module (10), wherein the seal arrangement (40) comprises:

a tubular insert (48) having an axis of symmetry (46), the tubular insert (48) defining a bore extending in a direction of the axis of symmetry (46) and through which a cooling medium flows toward the power electronics system (24) to cool the power electronics system (24) and on which a first sealing element (62, 72) is arranged, a further sealing element (64, 76, 80) is associated with one end face (96, 98) of the tubular insert (48), and an overflow opening (56) is provided between the sealing elements (62, 72; 64, 76, 80).

2. The seal arrangement (40) according to claim 1, wherein the tubular insert (48) is accommodated in a recess (52) of a housing (12) of the electric machine (14) and the overflow opening (56) is formed in a wall defining the recess (52) of the housing (12).

3. The seal arrangement (40) according to claim 2, wherein the tubular insert (48) is configured in a conicity (66) which corresponds to a conicity (68) of the recess (52) in the housing (12).

4. The seal arrangement (40) according to claim 1, wherein the first sealing element (62) is configured as an O-ring (86) and is seated on a lateral surface (54) of the tubular insert (48).

5. The seal arrangement (40) according to claim 1, wherein the first sealing element (62) is configured as a V-shaped sealing disk (72) and is seated on one end face (96, 98) of the tubular insert (48).

6. The seal arrangement (40) according to claim 1, wherein the further sealing element (64) is configured as an O-ring (86) and is seated on a lateral surface (54) of the tubular insert (48).

7. The seal arrangement (40) according to claim 1, wherein the further sealing element (64) is configured as a V-shaped sealing disk (72) or as an X-ring (80) and is associated with one end face (96, 98) of the tubular insert (48).

8. The seal arrangement (40) according to claim 1, wherein the first sealing element (62) and the further sealing element (64), which are each designed as an O-ring (86), are arranged at a vertical distance (70) from one another on the tubular insert (48).

9. The seal arrangement (40) according to claim 2, wherein a cavity (42) of the power electronics system (24) is sealed against a cooling medium flowing through the housing (12) via the first sealing element (62, 72).

10. The seal arrangement (40) according to claim 1, further comprising an insert part (82) on which an O-ring (86) is accommodated and which encloses a tube (90), wherein the O-ring (86) seals a cavity (42) of the power electronics system (24) against a cooling medium flowing through the tube (90).

11. The seal arrangement (40) according to claim 10, wherein the insert part (82) and the tube (90) are sealed via a molded seal (84) or via a further sealing ring (94).

* * * * *